United States Patent Office 3,168,661
Patented Feb. 2, 1965

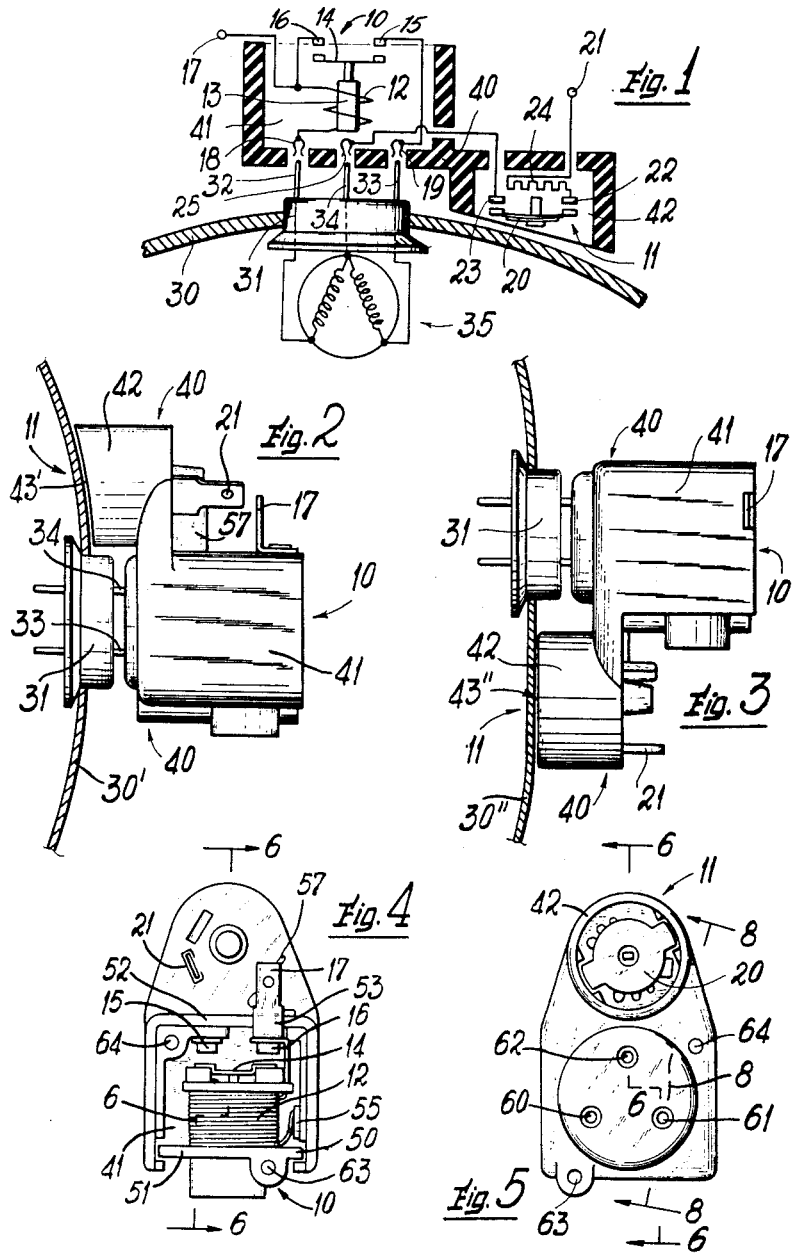

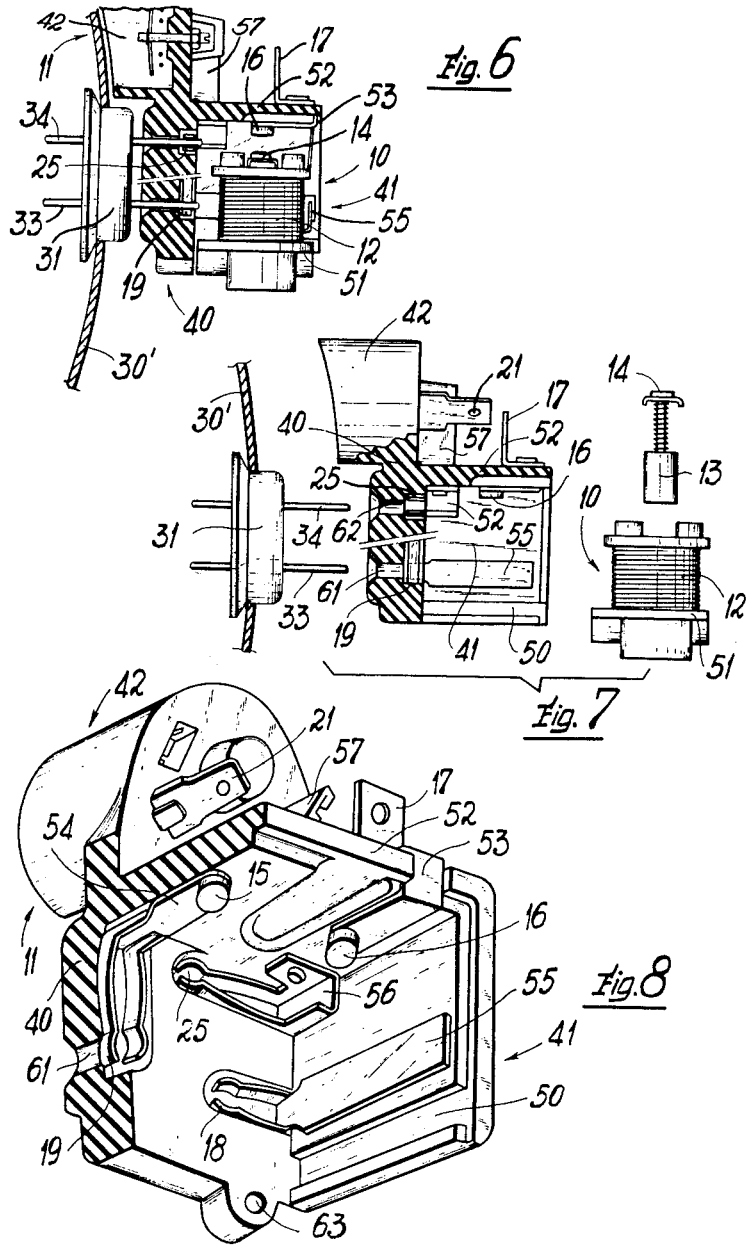

3,168,661
STARTING RELAY AND PROTECTOR DEVICE
FOR ELECTRIC MOTORS
Vincenzo Rini, Milan, Italy, assignor, by mesne assignments, to AMF Overseas Corporation, Vernier, Geneva, Switzerland
Filed Nov. 23, 1960, Ser. No. 71,287
Claims priority, application Italy, Nov. 28, 1959, 620,500
4 Claims. (Cl. 310—68)

This invention is concerned with starting relay and protector devices adapted for application to electric motors, in particular but not necessarily for electric motors of refrigerator implements and similar applications and units wherein a monophase electric motor requiring either a self-acting commutator or switching device for switching the feeding circuit from a starter motor winding to a running or service motor winding and a circuit breaker overload device adapted to break the said feeding circuit either if the fed current attains a given safety value and/or if the motor becomes overheated.

More particularly, the present invention relates to a starting relay and overload and overheat protector unit of the type adapted to be applied adjacent to the outer surface of the motor casing, whereby the protector device may be made responsive to the heat radiation from the motor. The unit is connected to the motor by a standard three-pole plug means fixedly connected to the motor, the said unit being provided with a three-pole socket means mating with said three-pole plug means and with two terminals adapted for connection with the service two-pole A.C. supply.

Such starter and protector units are generally constructed, as it is known to those skilled in the art to which this invention appertains, as comprising a case structure of electrically insulating material, having the various relay and protector components fixedly connected thereinto and provided with the required socket means and terminals.

A unit such as referred to above may be therefore considered as including two structural and operative devices, namely a first current responsive device having coil controlled switch means and a second heat responsive device having a heat responsive component. The latter component only is obviously intended to be controlled by heat radiation from the motor, while the former device is supposed to operate irrespectively of the heat condition.

According to the present invention, it has been found that while the said heat responsive element or component will obviously best operate and most promptly respond to any undesirable overheating when it is located adjacent to the motor casing and not shielded therefrom, the unit may be surprisingly improved in operation by evenly protecting the starting device and in particular the relay coil from heat radiation from the motor or the known resistor connected in the supply circuit for responding to any possible current overload.

It is therefore an object of this invention to provide a new and advantageous starting relay and protector device comprising a casing including a wall portion of heat insulating material. The wall portion has a first face and an opposite face. Holes are formed through the wall portion for passage of the motor plug means as the device is applied to the motor with the first face of the wall portion adjacent to the motor. Socket means on the opposite face connect with the plug means passing through the holes. The relay coil and coil controlled components and contacts of the starter switch are supported in the casing on the opposite face of the wall portion thereof. A heat responsive component and a heat controlled component including a bimetal and a resistor, are connected to the casing on the first face of the wall portion. The heat controlled and heat responsive components of the unit may be subjected to the heat radiation from the motor, but the relay coil and coil controlled components are shielded from the heat from the motor and from the resistor of the protector by the heat shielding and insulating wall portion.

The novel features of the present invention are set forth in particular in the appended claims. The present invention, both as to its construction and manner of operation, together with further objects and advantages thereof, will be best understood by way of illustration and example by the following detailed description of preferred forms of embodiment thereof when taken in conjunction with the accompanying drawings, forming an essential component of this disclosure, and wherein:

FIGURE 1 diagrammatically illustrates in longitudinal sectional view a typical unit including a starter device, a protector device and the various circuits and connections associated therewith;

FIGURES 2 and 3 are side elevational views of a first and second form of embodiment of an unit improved according to the invention, and designed for application to differing shaped motor casings, respectively;

FIGURES 4 and 5 are front and respectively rear elevational views of the embodiment of FIG. 2;

FIGURE 6 is a sectional view of the embodiment of FIG. 4, taken along the lines 6—6 of FIG. 4;

FIGURE 7 is an exploded view of the unit and associated components of FIG. 6; and FIGURE 8 is an enlarged perspective view partly in section, of the embodiment of FIG. 5, taken along the lines 8—8 of FIG. 5.

In the drawings like reference numerals refer to like parts and elements throughout the several figures.

The combination and the general arrangement of the various devices and components included in and critical of a relay and protector unit produced according to this invention are shown in FIG. 1. The structure of the invention includes, in its broadest aspect, a "relay" portion and a "protector" portion, such portions being generally indicated at 10 and 11, respectively. The said relay portion 10 includes a coil 12 which, upon the passage of an electric current of given magnitude, may displace a core 13 connected to a two point switch 14 for electrically connecting two stationary contacts 15 and 16. The relay is connected between the supply and the starting and operating windings of the motor, generally indicated at 35, according to current knowledge of the art.

In particular, the relay coil 12 is connected between a first terminal 17, to be connected to one supply conductor lead, and a socket 18 included in the unit. Stationary contact 16 is connected between said terminal 17 and said coil 12, and the other stationary contact 15 is connected to another socket 19. Said sockets 18 and 19 are adapted to receive plugs 32 and 33, respectively, included in standard made plug means 31, secured to the casing 30 of the motor and having three plugs 32, 33 and 34 radially extending therefrom. The plugs are conventionally connected to the starting and running windings respectively of the motor, whereby switching the supply to plug 32 or to plug 33 will switch the motor from its starting to its regular operating or running condition, and vice versa. Of course, since the movable member 14 of the relay does not connect the contacts 15 and 16, the coil 12 is connected in series with one motor winding, while upon connection of the contacts 15 and 16 via the member 14 the other motor winding supply circuit bypasses the relay coil 12, according to current art.

The unit includes a third socket means 25 adapted to receive the third plug 34 of the plug 31 of the motor. The third socket 25 is connected to the other terminal 21 of the supply via a heat controlled switch having movable contacts carried by a bimetal 20 adapted to normally close a circuit between stationary contacts 22 and 23 and to break such circuit when said bimetal 20 responds to an overheat, and via a resistor 24 connected in series between said contact 22 and said supply terminal 21. The resistor 24 is located adjacent to the bimetal 20 so that the latter is made responsive to the heat radiated from said resistor.

For proper operation of the unit, according to current art, it is obviously desirable that the heat responsive component, namely the bimetal 20, should be located adjacent and not shielded from the outer surface 30 of the motor casing for the heat responsive component to promptly respond to any overheating of the motor. Therefore, the described unit may operate, according to current art, either as a starter, due to the operation of the coil 12 controlled relay, and as a protector, due to the sensitivity of the heat responsive component 20, which may break the supply either if a current overload occurs (detected by overheating of the resistor 24) or if motor overheating occurs (directly detected by the said heat responsive component 20).

A relay and protector unit of the character referred to above includes therefore two different and operatively independent devices only one of which, namely the protector which includes a heat responsive component, is required to be arranged for the most sensitivity to the heat radiation from the motor, while the other is supposed to be uninfluenced by such heat and, in general, to be independent from any thermal action or condition. In the construction of currently manufactured units of the type of the present invention, the problem of the influence of heat on the relay portion of the unit had been heretofore disregarded, as proper operation of the unit has been believed to be unaffected by such heat.

In accordance with the present invention, a proper and positive heat insulation of the coil controlled relay portion of the unit may greatly improve the device of the present invention in safety of operation and durability of the coil and for constant operation of the relay device under differing motor temperatures (the room temperature of the coil noticeably modifies the magnitudes of its energizing voltages). In the unit of the present invention, the casing is formed of heat insulating material and includes an insulating wall portion 40 defining a plane through which the said plugs 32, 33 and 34 may pass for connection with the sockets in the unit. A relay casing portion or housing 41 is located beyond the wall portion 40 with respect to the motor and is thus heat insulated from the motor. A protector casing portion or housing 42 is located between the plane defined by said wall portion 40 and the motor to which the unit is applied and is arranged and shaped for location adjacent to the outer surface of the motor casing 30.

The merely structural arrangement and shape of the various casing portions of the unit of the present invention may obviously be varied according to the type and the shape of the motor or of the implement to which the unit is intended to be applied. FIGS. 2 and 3 represent by way of example two possible differently shaped embodiments of the unit of the present invention. In FIG. 2 the protector casing portion 42 is located above the relay casing portion 41 and is provided with a curved edge portion 43' designed for mating with a correspondingly curved motor casing 30'. In FIG. 3, on the contrary, the protector casing portion 42 is located below the relay casing portion 41 and is provided with a plane edge portion 43" designed for location adjacent to a substantially flat portion of a differently shaped motor casing 30". The variation of the shape of the casing structure of the unit is not related to the character of the invention.

The invention will therefore be further explained with reference to FIGS. 4 to 8, wherein although the form of the embodiment of FIG. 2 only is shown, as it is obvious that the adaptation of the details described hereinafter for differently shaped units is merely a matter of skill.

In the form of the embodiment of FIGS. 2 and 4 to 8 inclusive, the unit of the present invention includes a casing of electric and heat insulating material, such as, for example, a thermosetting resin, integrally forming the said wall portion 40 and the relay casing portion 41 and the protector portion 42. The said wall portion 40 is preferably made thick relative to the rest of said wall portion where it adjoins the plug means of the motor, as shown in FIGS. 6 to 8. The relay casing portion 41 is provided with side walls integrally extending from said wall portion 40 and formed with in-facing grooves 50 in the inner surface (FIGS. 7 and 8) wherein a plate 51 (FIGS. 4, 6 and 7) may be slidably supported. The plate 51 is designed to support the relay device.

The same relay casing portion also includes an upper wall 52 having an inner or under surface to which the stationary contacts 15 and 16 of the coil controlled switch are fixedly connected above the movable contacts formed on a cross-member 14 connected to the core of the coil 12, as shown in FIGS. 4 and 7. The stationary contact 16 is integrally connected to an end portion of a metallic strip 53 the other end portion of which actuates the terminal 17 to which one of the supply conductors may be connected, by welding or by means of a screw. The other stationary contact 15 is integrally connected to an end portion or another metallic strip 54 whose other end portion is formed into a resilient fork-type socket which actuates the socket 19 designed to cooperatively engage with the plug 33 of the motor.

The other socket means 18 and 25 similarly include resilient fork-shaped end portions, respectively of a metallic strip 55 designed to be connected, preferably by welding, to one terminal of coil 12 and a metallic strip 56 whose other end portion may be electrically connected, for example, by means of a metallic rivet through the upper wall 52, to an upper shaped metallic strip 57 connected to one of the stationary contacts of the protector device enclosed in the said protector casing portion 42. The other stationary contact of the protector is connected, via the resistor enclosed in the casing portion 42 too, to another shaped metallic strip which serves as the other supply terminal 21.

Holes 60, 61 and 62 are formed through the insulating wall 40 in coaxial relation with the forked sockets 18, 19 and 25, which are relatively located for cooperating with the plug means of the motor. The holes 60, 61 and 62 are positioned and sized for passage of said plugs 32, 33 and 34, respectively. The said relay device supported by plate 51 may be secured into its casing portion 41 by any suitable means such as, for example, a front plate secured to the casing rivets or bolts located into holes 63 and 64 (FIGS. 4 and 5), for example.

It is therefore believed to be evident that the present invention provides a plurality of advantageous features, and it will be understood that each of the new features described and shown and any combination thereof may also find useful application in other relay and protector implements differing from the ones described.

Without further consideration, the foregoing will so fully reveal the gist of this invention that others can, by applying current knowledge, readily adapt it for other applications without omitting features that, from the standpoint of prior art, fairly constitute essential characteristics of this invention and, therefore, such adaptations should and are intended to be comprehended within the spirit and meaning of this invention as above set forth and defined in and by the appended claims.

Having thus described the invention, what I claim as new and desire to have protected by Letters Patent of the United States of America is:

1. In a starting relay and protector unit for an electric motor having a motor casing and plug means on the motor casing, in combination, a housing comprising a first chamber having a transverse wall facing said plug means and being formed with socket means for receiving said plug means of said motor, said first chamber being open on the side thereof remote from said motor casing, and a second chamber having a transverse wall and side walls extending from said transverse wall of said second chamber toward said motor into close proximity to the outer surface thereof and said second chamber being open at the side adjacent to said motor casing; a starting relay in said first chamber; a heat responsive switch in said second chamber, whereby said starting relay is protected from the heat radiation of said motor while said heat responsive switch is subjected to said heat radiation.

2. In a starting relay and protector unit for an electric motor having a motor casing and plug means on the motor casing, in combination, a one-piece housing from heat insulating material comprising a first chamber having a transverse wall facing said plug means and being formed with socket means for receiving said plug means of said motor, said first chamber being open on the side thereof remote from said motor casing, and a second chamber having a transverse wall and side walls extending from said transverse wall of said second chamber toward said motor into close proximity to the outer surface thereof and said second chamber being open at the side adjacent to said motor casing; a starting relay in said first chamber; a bimetallic heat responsive switch in said second chamber, whereby said starting relay is protected from the heat radiation of said motor while said heat responsive switch is subjected to said heat radiation.

3. In a starting relay and protector unit for an electric motor having a motor casing and plug means on the motor casing, in combination, a one-piece housing from heat insulating material comprising a first chamber having a transverse wall facing said plug means and being formed with socket means for receiving said plug means of said motor, said first chamber having side walls extending from said transverse wall in direction away from said motor casing and being open on the side thereof remote from said motor casing, and a second chamber having a transverse wall located in a plane with said transverse wall of said first chamber and side walls extending from said transverse wall of said second chamber toward said motor into close proximity to the outer surface thereof and said second chamber being open at the side adjacent to said motor casing; a starting relay in said first chamber; a bimetallic heat responsive switch in said second chamber, whereby said starting relay is protected from the heat radiation of said motor while said heat responsive switch is subjected to said heat radiation.

4. In a starting and protector unit as set forth in claim 1, wherein said side walls of said second chamber have free edges similar in shape to the shape of the motor casing at the area of the latter facing said second chamber.

References Cited by the Examiner
UNITED STATES PATENTS

| | | | |
|---|---|---|---|
| 2,425,668 | 8/47 | Bolesky et al. | 318—221 |
| 2,624,030 | 12/52 | Swan | 318—221 |

ORIS L. RADER, *Primary Examiner.*

MILTON O. HIRSHFIELD, *Examiner.*